(12) United States Patent
Kern et al.

(10) Patent No.: US 9,474,937 B2
(45) Date of Patent: Oct. 25, 2016

(54) APPARATUS, IN PARTICULAR FOR BALANCE TRAINING, HAVING AT LEAST ONE MOVABLE PLATFORM

(71) Applicant: Astrium GmbH, Taufkirchen (DE)

(72) Inventors: Peter Kern, Salem (DE); Ulrich Kuebler, Markdorf (DE); Matthias Simnacher, Markdorf (DE); Marcos Esteller Vela, Tervel (ES)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/220,604

(22) Filed: Mar. 20, 2014

(65) Prior Publication Data
US 2014/0287895 A1    Sep. 25, 2014

(30) Foreign Application Priority Data

Mar. 21, 2013 (EP) .................................... 13160477

(51) Int. Cl.
*A63B 22/14* (2006.01)
*A63B 22/16* (2006.01)
(Continued)

(52) U.S. Cl.
CPC ........... *A63B 26/003* (2013.01); *A63B 21/023* (2013.01); *A63B 21/0442* (2013.01); *A63B 22/18* (2013.01); *A63B 24/0087* (2013.01); *A63B 71/0622* (2013.01);
(Continued)

(58) Field of Classification Search
CPC .......... A63B 1/00; A63B 1/005; A63B 3/00; A63B 21/1496; A63B 23/1209; A63B 23/1218; A63B 26/003; A63B 22/0015; A63B 22/0046; A63B 22/0087; A63B 22/14; A63B 22/16; A63B 22/18; A63B 22/20; A63B 22/201; A63B 22/203; A63B 21/00007; A63B 21/00014; A63B 21/0004; A63B 21/023; A63B 21/026; A63B 21/04; A63B 21/0407; A63B 21/0428; A63B 21/055; A63B 21/05555; A63B 21/1488; A63B 21/151; A63B 21/153; A63B 23/03
See application file for complete search history.

(56) References Cited

U.S. PATENT DOCUMENTS 3,659,844 A * 5/1972 Cummins ...................... 482/130
4,509,743 A * 4/1985 Lie .................................. 482/71
(Continued)

FOREIGN PATENT DOCUMENTS

EP    1 880 702 A2    1/2008
WO    2007/141429 A1   12/2007

OTHER PUBLICATIONS

Extended European Search Report dated Sep. 4, 2013 issued in corresponding EP patent application No. 131 604 77.9 (and partial English translation).
(Continued)

*Primary Examiner* — Oren Ginsberg
*Assistant Examiner* — Nyca T Nguyen
(74) *Attorney, Agent, or Firm* — Posz Law Group, PLC

(57) ABSTRACT

An apparatus has at least one first connecting element and at least one second connecting element which connect the counterforce unit to the at least one platform, the at least one first connecting element and the at least one second connecting element being arranged on the at least one platform at a respectively different spacing from a center of said at least one platform and transmitting to the at least one platform a counterforce, generated by the counterforce unit, to a rotational component of a deflection of the at least one platform.

20 Claims, 3 Drawing Sheets

Figure 1:
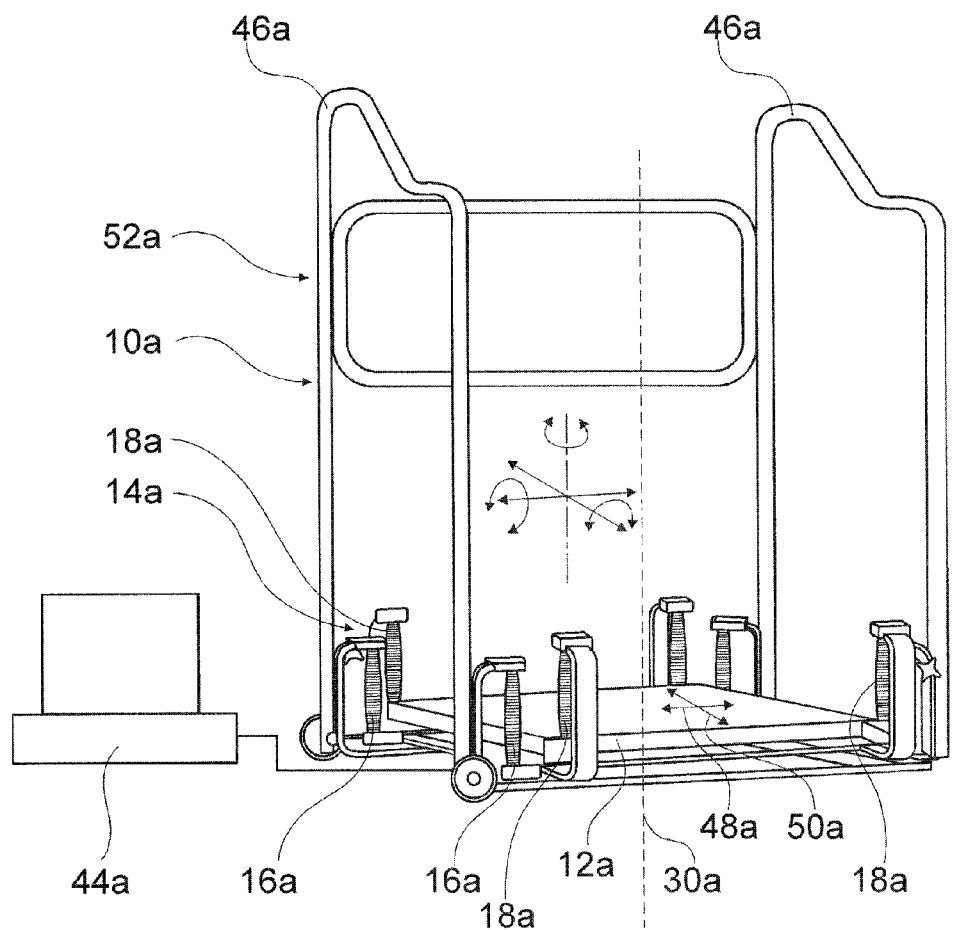

(51) Int. Cl.
| | |
|---|---|
| *A63B 26/00* | (2006.01) |
| *A63B 71/06* | (2006.01) |
| *A63B 22/18* | (2006.01) |
| *A63B 21/02* | (2006.01) |
| *A63B 21/04* | (2006.01) |
| *A63B 24/00* | (2006.01) |
| *A63F 13/90* | (2014.01) |
| *A63F 13/24* | (2014.01) |
| *A63F 13/214* | (2014.01) |
| *A63B 71/00* | (2006.01) |
| *A63B 21/005* | (2006.01) |
| *A63B 21/012* | (2006.01) |
| *A63B 21/055* | (2006.01) |
| *A63B 21/00* | (2006.01) |
| *A63B 22/00* | (2006.01) |
| *A63B 71/02* | (2006.01) |

(52) U.S. Cl.
CPC ............ *A63F 13/214* (2014.09); *A63F 13/24* (2014.09); *A63F 13/90* (2014.09); *A63B 21/0051* (2013.01); *A63B 21/0056* (2013.01); *A63B 21/00196* (2013.01); *A63B 21/012* (2013.01); *A63B 21/0552* (2013.01); *A63B 2022/0092* (2013.01); *A63B 2024/0093* (2013.01); *A63B 2071/0072* (2013.01); *A63B 2071/025* (2013.01); *A63B 2071/0652* (2013.01); *A63B 2071/0683* (2013.01); *A63B 2220/18* (2013.01); *A63B 2220/34* (2013.01); *A63B 2220/44* (2013.01); *A63B 2220/806* (2013.01); *A63B 2220/89* (2013.01)

(56) References Cited

U.S. PATENT DOCUMENTS

| | | | | |
|---|---|---|---|---|
| 5,429,562 | A | * | 7/1995 | Milner ............................ 482/51 |
| 5,582,567 | A | * | 12/1996 | Chang ............................ 482/146 |
| 6,217,488 | B1 | * | 4/2001 | Bernardson ..................... 482/79 |
| 6,500,097 | B1 | * | 12/2002 | Hall ................................ 482/54 |
| 6,958,032 | B1 | * | 10/2005 | Smith et al. ................... 482/121 |
| 2008/0254958 | A1 | * | 10/2008 | Ferrara .......................... 482/142 |
| 2009/0133294 | A1 | | 5/2009 | Harwin |
| 2009/0186746 | A1 | | 7/2009 | Pandolfo |
| 2009/0227426 | A1 | * | 9/2009 | Dubar ................ A63B 21/0004 482/34 |
| 2009/0312165 | A1 | * | 12/2009 | Rempe .......................... 482/146 |
| 2010/0210429 | A1 | * | 8/2010 | Wang ............................ 482/127 |
| 2013/0045812 | A1 | * | 2/2013 | Garner ............................ 472/97 |

OTHER PUBLICATIONS

Office Action dated Mar. 17, 2016 issued in corresponding EP patent application No. 13 160 477.9 (and partial English translation).
Office Action issued Sep. 29, 2015 in the corresponding JP application No. 2014-058883 (with English ranslation).

\* cited by examiner

APPARATUS, IN PARTICULAR FOR BALANCE TRAINING, HAVING AT LEAST ONE MOVABLE PLATFORM

CROSS REFERENCE TO RELATED APPLICATION

This application is based on and incorporates herein by reference European Patent Application No. 13160477.9 filed on Mar. 21, 2013.

PRIOR ART

The invention relates to an apparatus in accordance with the precharacterizing clause of claim 1.

Apparatuses for balance training and/or fine motor skills training have at least one movable platform which can be moved in at least two dimensions in a rocking manner. Apparatuses are known with damping elements for damping movements of the movable platform, which damping elements are configured, for example, as plastic-encapsulated steel cables which fasten the platform in a hanging manner and have a damping effect on account of material properties of the plastic encapsulation. The known damping elements can be set merely very roughly and a dynamic change or adaptation of damping properties during operation of the apparatus is not possible.

It is the objective of the invention, in particular, to provide an apparatus of the generic type with improved properties with regard to adaptability of a damping action. According to the invention, the objective is achieved by way of the features of Patent Claim 1, whereas advantageous refinements and developments of the invention can be gathered from the subclaims.

ADVANTAGES OF THE INVENTION

The invention proceeds from an apparatus, in particular for balance training and/or fine motor skills training, having at least one movable platform which can be moved at least rotationally, and having at least one counterforce unit which is provided to oppose a torque that leads to a rotation of the at least one platform by means of a resistance, which torque leads to a rotation of the at least one platform. A "movable platform which can be moved at least rotationally" is to be understood to mean, in particular, a platform, preferably a flat platform, which is mounted in such a way, for example by means of suspension on a framework, that it can be set at least in rotation about a yaw axis, in particular center axis of a rest position, and can preferably additionally be deflected translationally within a predefined deflection region along two directions in one plane which run perpendicularly with respect to one another, preferably a plane parallel with respect to a floor, on which the apparatus is set up, and which has a restoring means of the deflection to a rest position. In addition to the deflection in two directions in the plane, the movable platform can preferably also be tilted in a direction perpendicular with respect to the plane or can be deflected three-dimensionally by a rolling and/or tilting angle without a translational movement. The platform has a standing surface, on which a person stands who deflects the platform on account of his/her own movements and/or counteracts a deflection of the platform as a result of an external stimulus. The standing surface is preferably of flat configuration, but the standing surface can in principle also be configured to be curved or in other basic shapes which are different from a flat surface, for example hemispherical. The apparatus is provided, in particular, for use for training in order to reinforce the sense of balance or for a therapy for disruptions of the sense of balance. A "counterforce unit which opposes a force for deflection of the movable platform by means of a resistance" is to be understood to mean, in particular, a unit which is provided to oppose a force which leads to a deflection of the platform with a counterforce and thus to oppose a deflection of the platform by means of a defined resistance. To this end, the counterforce unit comprises, in particular, elastic elements which generate a restoring force, such as spring elements.

It is proposed that the apparatus has at least one first connecting element and at least one second connecting element which connect the counterforce unit to the at least one platform, the at least one first connecting element and the at least one second connecting element being arranged on the at least one platform at a respectively different spacing from a center of said at least one platform. In particular, the at least one first connecting element and the at least one second connecting element transmit at least one counterforce which is generated by the counterforce unit to the at least one platform, the counterforce being converted into a countermoment which counteracts a rotation of the at least one platform, on account of the respectively different spacing of the at least one first connecting element and the at least one second connecting element from the center of the platform. A "connecting element" is to be understood to mean, in particular, an element which is provided to transmit a deflection of the platform from the rest position to at least one further element. The connecting element is preferably configured as a flexurally slack element. By means of an attachment of the connecting elements at different spacings from the center of the platform, the first connecting element and the second connecting element are moved to different extents as a result of a rotational movement of the platform, as a result of which a purely rotational component of a platform movement is transmitted and a counterforce can be exerted by the counterforce unit to the purely rotational component of platform movement. In particular, the connecting elements likewise transmit a counterforce which is generated by the counterforce unit and is opposed to a purely translational deflection of the platform. In particular, the rotational component, in particular also a rotation about a zero axis in a rest position, can be loaded with a counterforce by way of the at least one first connecting element and the at least one second connecting element with a small number of connecting elements. In particular, the counterforce is applied by the counterforce unit in addition to any counterforces as a result of twisting or material elasticities of suspension elements of the platform or the like and is introduced onto the platform and is preferably variable and can preferably be set and/or adapted during platform operation. In particular, a countermoment with respect to a rotational component of a platform movement can be generated in addition to a counterforce with respect to a translational component of the platform movement, and countereffects of different magnitudes with respect to translations and rotations of the platform can be provided, as a result of which additional setting options for a training platform and complex training options with a high training effect are provided.

Furthermore, it is proposed that the at least one first connecting element is configured as a central connecting element which, in at least one rest position of the platform, runs at least partially along a zero axis of the rest position of the platform. A "zero axis of a rest position of the platform" is to be understood to mean, in particular, an axis which lies perpendicularly on a plane of the platform and runs through a geometric center of the platform in a rest position of the platform. A "central connecting element" is to be understood to mean, in particular, that the connecting element is arranged at least in a region close to the zero axis of the rest position of the platform, is preferably fastened to a center point of a surface of the platform, and that the connecting element converts deflections of equal magnitude of the platform in directions which are opposite one another into an identical deflection. In particular, damping of translational movements of the platform can take place via the central connecting element by way of damping of a movement of the central connecting element. "Damping of movements" is to be understood to mean, in particular, that the movements are opposed by a counterforce, in particular a restoring force, or a countermoment, with the result that a deflection or rotation of the platform which is achieved by an acting, deflecting force or an acting torque is smaller than a deflection or rotation as a result of the acting, deflecting force or the acting torque which can act in a manner which is free from damping. In particular, the central connecting element is provided to transmit the at least two-dimensional movement to the counterforce unit in a one-dimensional manner. In particular, a reduction in a number of required counterforce elements which generate a resistance with respect to deflections and rotational movements of the platform can be achieved.

Furthermore, it is proposed that the at least one first connecting element and the at least one second connecting element are connected to the counterforce unit separately from one another. "The at least one first connecting element and the at least one second connecting element are connected to the counterforce unit separately from one another" is to be understood to mean, in particular, that the at least one first connecting element and the at least one second connecting element are arranged such that they are not connected to one another and are connected in each case to different counterforce elements in order to generate a counterforce, with the result that the at least one first connecting element and the at least one second connecting element are loaded by different counterforce elements with a respective counterforce in order to generate a countermoment, which counterforce is opposed to a rotational movement of the platform. In particular, a connection to the counterforce unit which generates a counterforce with respect to a rotational movement of the platform can be achieved in a structurally simple manner.

Furthermore, it is proposed that the at least one first connecting element and the at least one second connecting element are configured at least partially in one piece with one another. "The at least one first connecting element and the at least one second connecting element are configured at least partially in one piece with one another" is to be understood to mean, in particular, that the at least one first connecting element and the at least one second connecting element are at least fastened to one another or emanate from a common element, for example as dividing part strands of a common cable element. In particular, the at least one second connecting element forms a Y-shaped connection together with the at least one first connecting element at a contact point. In particular, the at least one first connecting element and the at least one second connecting element are connected to the counterforce unit at a region, in which they are configured in one piece with one another. In particular, a number of required counterforce elements of the counterforce unit for generating a countermoment can be reduced.

Furthermore, it is proposed that the at least one central connecting element transmits the at least two-dimensional movement of the at least one platform to the at least one counterforce unit in a one-dimensional manner. In particular, a reduction in a required number of counterforce elements of the counterforce unit can be achieved.

Furthermore, it is proposed that the at least one counterforce unit has at least one movement conversion unit which converts a rotational component of the at least two-dimensional movement of the at least one platform into a rotational movement of the at least one central connecting element about an axis of its own. In particular, an amount of a translational deflection of the platform from the rest position remains as a deflection of the central connecting element. In particular, the rotational component of the movement of the platform is converted into a rotational component of a movement of the at least one central connecting element in a part region of the central connecting element, which part region is arranged between the at least one movable platform and the at least one movement conversion unit, and said rotational component of the movement of the central connecting element is converted into a rotational movement of the central connecting element about the axis of its own. In particular, the at least two-dimensional movement of the platform is therefore converted into a one-dimensional movement of the central connecting element. A "movement conversion unit" is to be understood to mean, in particular, a unit which is provided for converting a movement in a rotational or translational direction into a movement in another rotational or translational direction. The movement conversion unit is preferably provided to reduce a dimensionality of a movement, by, for example, a two-dimensional movement with a rotational component being converted into a purely translational movement in one dimension. The movement conversion unit preferably comprises an element, about which the central connecting element can rotate, in order to convert the rotational component of the movement into a rotation about the axis of the central connecting element. In particular, a reduction in a number of required damping elements can be achieved, by way of only a translational deflection of the platform from the rest position still being opposed by a resistance.

Furthermore, it is proposed that the at least one movement conversion unit has at least one sleeve or at least one bore with a rounded opening. In particular, the sleeve or bore with a rounded opening is provided to convert a rotational component of a movement of the central connecting element into a rotation about the axis of its own of the central connecting element, by the central connecting element rotating about a contact point with the sleeve or bore at the rounded opening. In alternative refinements, in principle, the opening can be formed by a sharp-edged opening instead of a rounded opening. In particular, a structurally simple movement conversion unit can be achieved.

The at least one central connecting element is preferably formed at least partially by a cable element. A "cable element" is to be understood to mean, in particular, a flexurally slack elongate element which consists of natural or artificial fibers or of metallic wires, the fibers or wires being twisted, which element is provided for a transmission of tensile forces. In particular, the cable element is formed from a steel cable comprising steel wires. In particular, a cable element can have a coating, a sleeve or an encapsulation made from an identical or different material than a material of the fibers or wires. In principle, the central connecting element can be formed at least partially by a chain element. In particular, a central connecting element which can be produced simply and is inexpensive can be achieved.

Furthermore, it is proposed that the at least one counterforce unit has at least one spring element. A "spring element" is intended to mean, in particular, a macroscopic element which, in a normal operating state, can be changed elastically in at least one length by at least 10%, in particular by at least 20%, preferably by at least 30% and particularly advantageously by at least 50%, and which generates in particular a counterforce which counteracts the change and is dependent on a change in the length and is preferably proportional to the change. A "length" of an element is to be understood to mean, in particular, a maximum spacing of two points of a perpendicular projection of the element onto a plane. A "macroscopic element" is to be understood to mean, in particular, an element having an extent of at least 1 mm, in particular of at least 5 mm, preferably of at least 10 mm and particularly preferably of at least 50 mm. In particular, the spring element is connected to the central connecting element and opposes a deflection of the central connecting element by means of a resistance which is dependent on a prestress, with the result that deflections in one direction are opposed by a resistance. The spring element can be configured as a linearly elastically deformable element or as a torsion spring element. In principle, instead of or in addition to a spring element, the counterforce unit can comprise an additional damping element which can be arranged in series with or parallel to the spring element in the counterforce unit. It is also conceivable in principle to use a number of groups of spring elements and additional damping elements which are arranged parallel to one another, the number of groups being connected in parallel and/or series to one another. The additional damping element can be formed by an element having internal damping properties, for example a rubber cable or a braided rubber cable with a non-linear load characteristic. The additional damping element can be of integrated configuration with the spring element. In particular, a counterforce unit which is configured in a structurally simple manner can be achieved.

The apparatus preferably comprises at least one untwisting unit to connect the central connecting element and the spring element, which untwisting unit makes rotation of the central connecting element about the axis of its own possible. An "untwisting unit" is to be understood to mean, in particular, a unit which is fastened at one end to an element, in particular the central connecting element, and makes a rotation of the element about the axis of its own within the element possible, the rotation of the element being converted into an internal rotation of the untwisting unit. In particular, a structurally simple connection of the central connecting element and the spring element can be achieved.

Furthermore, at least one setting unit which is provided for setting a counterforce strength is proposed. A "setting unit" is to be understood to mean, in particular, a unit which acts on the counterforce unit in a manner which is manual or is controlled in an electronic way, and changes a counterforce strength of the counterforce unit and therefore the possible movement radius of the platform in the case of a given deflection force. The setting unit is preferably provided to change the counterforce strength during operation of the apparatus. In particular, an apparatus which can be adapted in a flexible manner to different conditions can be achieved.

Furthermore, it is proposed that the at least one setting unit has at least one actuator, preferably at least one electric actuator. An "electric actuator" is to be understood to mean, in particular, a mechatronic component which is provided to convert electric signals into a movement, in particular into a linear movement. In particular, the electric actuator is provided to set a prestress of the spring element. In particular, the actuator is provided for infinitely variable setting of the prestress. In particular, an infinitely variable setting unit which can be realized inexpensively and can be actuated simply can be achieved.

As an alternative, the at least one counterforce unit can have at least one directly adjustable damping element. A "directly adjustable damping element" is to be understood to mean, in particular, a damping element, the counterforce strength of which can be set by means of a direct electric actuation, in particular without previous actuation of an actuator for adapting a prestressing force, or by application of an external electric and/or magnetic field. In alternative refinements, instead of or in addition to a directly adjustable damping element and/or spring element, the counterforce unit can also have an eddy current brake or a friction brake. In particular, infinitely variable and rapid setting of a counterforce strength can be achieved in a structurally simple manner. In particular, the directly adjustable damping element can be formed by an electrorheological damper and/or a magnetorheological damper. An "electrorheological damper" is to be understood to mean, in particular, a damper having an electrorheological liquid. An "electrorheological liquid" is to be understood to mean, in particular, a liquid in which electrically polarizable particles are suspended and which liquid has a viscosity which can be changed by application of an electric field as a result of the formation of dipoles in the particles. A "magnetorheological damper" is to be understood to mean, in particular, a damper having a magnetorheological liquid. A "magnetorheological liquid" is to be understood to mean, in particular, a liquid in which magnetic polarizable particles are suspended and which liquid has a viscosity which can be changed by application of a magnetic field. In particular, a structurally simple and directly adjustable damping element can be achieved.

Furthermore, it is proposed that the at least one setting unit has at least one control unit. A "control unit" is to be understood to mean, in particular, a unit which has at least one computing unit and at least one memory unit and which is provided to execute at least one program which is stored in the memory unit and preferably to perform setting of the counterforce strength depending on the stored program and/or on a movement of the platform. In particular, the control unit can be provided to set the counterforce strength depending on measured values of at least one sensor for measuring a deflection of the platform, deflection speed or deflection acceleration. The sensor can be formed, for example, by a camera, an induction sensor or a further sensor for positional measurement which appears to be suitable to a person skilled in the art. In particular, an apparatus which can be adapted in a flexible manner can be achieved. In particular, an apparatus can be achieved which can be adapted readily and rapidly to different requirement options and which, in particular, can be combined with further external devices, for example a videogame console.

In addition, the at least one control unit can be provided for executing a training program, in which a slow reduction in the counterforce strength of the counterforce unit as a result of an increase of a deflection amplitude of the platform is superimposed with a rapid increase in the counterforce strength. A "slow reduction" and a "rapid increase" in the counterforce strength is to be understood to mean, in particular, that the reduction in the counterforce strength takes place slowly in comparison with the increase in the counterforce strength. An "increase of a deflection amplitude" is to be understood to mean, in particular, that an amplitude of deflections of the platform from the rest position increases on account of a diminishing of the counterforce strength and/or on account of movements of a person on the platform, for example compensating movements of the person in the case of an external stimulus. An increase of the deflection amplitude of the platform is preferably determined by the computing unit of the control unit. In particular, the rapid increase in the counterforce strength serves to avoid an excessively large increase of the deflection amplitude of the platform. In particular, the slow reduction of the counterforce strength is provided during the training program to challenge the person again and again during the training program as a result of a gradual increase in a deflection amplitude during an identical movement of the person on the platform, and therefore to achieve a high training effect. In particular, stability and motor capabilities of a person who passes through the training program can be determined and trained simply and reliably by way of a slow reduction of the counterforce strength and an increase, associated therewith, of a deflection of the platform, which deflection is brought about by movements of the person. In particular, a training program with a high stability which is adapted in a person-specific manner can be achieved. Furthermore, the central connecting element can be provided for damping the movement of the platform by means of external friction. "External friction" is to be understood to mean, in particular, a friction of the central connecting element with a further component of the apparatus, which component is different than the central connecting element. In particular, the central connecting element is provided to be in frictional contact with a surface of the sleeve or bore with a rounded opening in accordance with the Euler-Eytelwein formula and to convert kinetic energy into heat energy in a dissipative manner. In particular, additional damping of movements of the movable platform can be achieved.

Furthermore, it is proposed that the at least one counterforce unit has at least one element with a non-linear force characteristic. An "element with a non-linear force characteristic" is to be understood to mean, in particular, an element which experiences a non-linear extension under tensile stress, for example a rubber cable or a spring element with a non-linear force-extension characteristic curve. In particular, a high variability of the counterforce which is generated by the counterforce unit can be achieved.

The apparatus according to the invention is provided, in particular, to be used with respect to balance training and/or with respect to therapy. In therapy, the apparatus according to the invention can be used, for example, for muscle training. In particular, a use of the apparatus according the invention in cooperation with a games console is proposed. The apparatus according to the invention preferably comprises a control unit which is connected to the games console and can be configured either such that it is integrated into the games console or is separate from the latter. In particular, the control unit which is connected to the games console is formed by the control unit of the setting unit.

Furthermore, a use of the apparatus according to the invention under conditions of reduced gravity for balance training and/or fine motor skills training and/or for therapy is proposed. "Conditions of reduced gravity" are to be understood to mean, in particular, conditions, in which a gravitational effect of at most 0.9 g, advantageously at most $1*10^{-3}$ g, preferably at most $1*10^{-6}$ g and particularly preferably at most $1*10^{-8}$ g is active. The gravitational effect can be generated by gravity and/or artificially by way of an acceleration. "g" denotes the value of the gravitational acceleration on Earth of 9.81 m/s². In particular, a use of the apparatus according to the invention in cooperation with a games console under conditions of reduced gravity is proposed. In particular, a training possibility under conditions of reduced gravity which can be adapted simply to personal requirements can be provided.

In particular, a use of the apparatus according to the invention for a training program can be provided, in which a rapid increase of the counterforce strength by way of an increase of a deflection amplitude of the platform is superimposed on a slow reduction of the counterforce strength of the counterforce unit. In particular, a training program with a high stability which is adapted in a person-specific manner can be achieved.

The apparatus according to the invention is not to be restricted here to the above-described application and embodiment. In particular, the apparatus according to the invention can have a number of individual elements, components and units which differs from a number of said individual elements, components and units mentioned herein with respect to fulfilling a method of operation which is described herein.

DRAWINGS

Further advantages result from the following description of the drawings. The drawings show two exemplary embodiments of the invention. The drawings, the description and the claims contain numerous features in combination. A person skilled in the art will expediently also consider the features individually and combine them to form appropriate further combinations.

Figure 2:
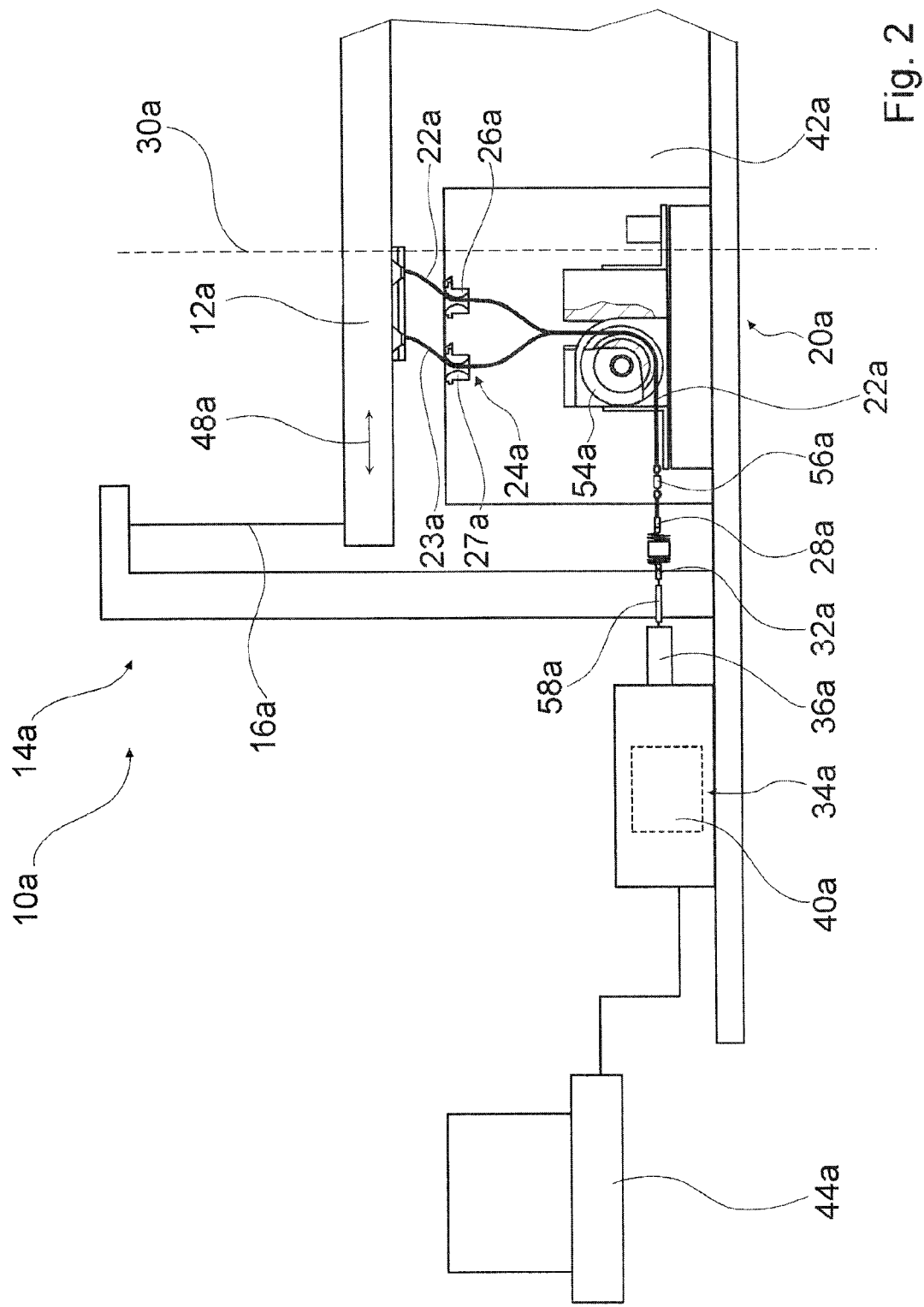
Figure 3:
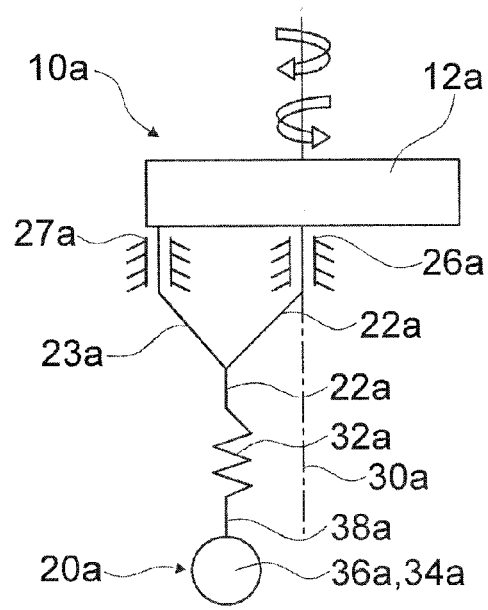
Figure 4:
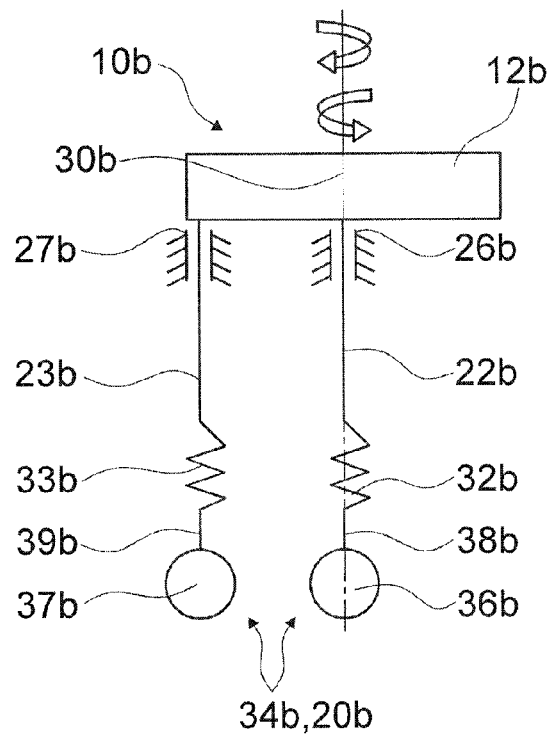

In the drawings:

FIG. 1 shows a diagrammatic illustration of an apparatus according to the invention having a platform which can be deflected rotationally and translationally, in a view obliquely from above, FIG. 2 shows an illustration of the apparatus with details of a counterforce unit, a first connecting element and with a second connecting element which is configured partially in one piece with the first connecting element, which connect the platform and the counterforce unit, which and introduces a counterforce which is generated by the counterforce unit, in order to generate a counter moment to a rotational movement of the platform, to the platform, FIG. 3 shows a diagrammatic illustration of an arrangement of the first connecting element and the second connecting element and a connection of the first connecting element and the second connecting element to the counterforce unit, and FIG. 4 shows a diagrammatic illustration of an alternative apparatus with an alternative arrangement of the first connecting element and the second connecting element and an alternative connection of the first connecting element and the second connecting element to the counterforce unit.

DESCRIPTION OF THE EXEMPLARY EMBODIMENTS

FIG. 1 shows an apparatus 10a according to the invention for balance training and/or fine motor skills training having a movable platform 12a which can be moved rotationally and translationally in two dimensions, and having a counterforce unit 20a which opposes a torque that leads to a rotation of the platform 12a by means of a resistance, in a view obliquely from above. The movable platform 12a is mounted in a rocking manner by means of suspension elements 16a, 18a of a suspension unit 14a on a frame 52a which can be manufactured, for example, from aluminum, the suspension elements 16a providing a mounting in one movement direction 48a of the movable platform 12a and the suspension elements 18a providing a mounting in a movement direction 50a of the movable platform 12a, which movement direction 50a is perpendicular with respect to the movement direction 48a of the movable platform 12a. Here, the suspension elements 16a, 18a are configured as plastic-encapsulated steel cables which bring about additional damping of the movement via a deformation of a material of a plastic encapsulation. The frame 52a has two handles 46a which are provided, in particular, as climbing aid. The platform 12a can be deflected in two movement directions 48a, 50a and therefore in two dimensions. In alternative refinements, the platform 12a can additionally also be of tiltable configuration. The apparatus 10a is provided for use in balance training during a therapy and, furthermore, is provided to be used in cooperation with a games console 44a. By way of cooperation with the games console 44a, in particular, a simulation of different conditions, for example for training, can be made possible. Use of the apparatus 10a can also take place under conditions of reduced gravity, for example on board a space station or a space capsule or on a moon, planet or asteroid, for training measures of astronauts to build up muscles. The movable platform 12a of a apparatus 10a is deflected by movements of a person standing on a flat surface of the platform 12a, it also being possible in alternative refinements for a surface of the platform 12a to have a shape which differs from a flat design. Furthermore, in alternative refinements, the movable platform 12a can be set in motion by deflection by means of a deflection unit, for example an attached eccentric motor, it being necessary for the person standing on the surface to compensate for the movement caused by the deflection unit in order to achieve a training effect.

The apparatus 10a has a counterforce unit 20a (FIG. 2). Moreover, the apparatus 10a has a first connecting element 22a and a second connecting element 23a which connect the counterforce unit 20a with the platform 12a, the first connecting element 22a and the second connecting element 23a being arranged on the platform 12a at a respectively different spacing from a center of said platform 12a. The first connecting element 22a and the second connecting element 23a transmit a counterforce to the platform 12a, which counterforce is generated by the counterforce unit 20a, the counterforce being converted into a countermoment which counteracts a rotation of the platform 12a on account of the respectively different spacing of the at least one first connecting element 22a and the at least one second connecting element 23a from the center of the platform 12a. The first connecting element 22a is configured as a central connecting element 22a which runs at least partially along a zero axis 30a of a rest position of the platform 12a. The first connecting element 22a and the second connecting element 23a are configured at least partially in one piece with one another and form a Y-shape at a contact point. As viewed from the platform 12a, the second connecting element 23a is connected to the counterforce unit 20a after a transition in the Y-shape into the first connecting element 22a. The central connecting element 22a is formed by a cable element which is configured as a steel cable. In alternative design variants, the central connecting element 22a can also be formed by a cable element made from a different material than steel and can have, for example, a coating, or the central connecting element 22a can be formed at least partially by a chain. The central connecting element 22a is connected to the movable platform 12a at a center point of a lower surface of said movable platform 12a.

A rotational component and a translational component of movements of the platform 12a are transmitted by the first connecting element 22a and the second connecting element 23a, the translational component and the rotational component being converted in different ways into a one-dimensional translation of the first connecting element 22a and the second connecting element 23a. In the following text, a transmission of the translational component of the movement of the platform 12a will be described first of all. The first connecting element 22a which is configured as a central connecting element 22a and the second connecting element 23a transmit the translational component of an at least two-dimensional movement of the platform 12a in a one-dimensional manner to the counterforce unit 20a. Here, a movement conversion unit 24a converts a rotational component of the at least two-dimensional movement of the platform 12a into a rotational movement of the central connecting element 22a about an axis of its own. The movement conversion unit 24a has a bore 26a in a body with a rounded opening. In an alternative refinement, instead of a bore 26a in a body, the movement conversion unit 24a can have a sleeve with a rounded opening. In principle, it is likewise conceivable that the bore 26a or the sleeve has a sharp-edged opening. The central connecting element 22a is guided through the bore 26a, said central connecting element 22a bearing against the opening. During a deflection of the platform 12a from the rest position, the translational component of the deflection and therefore the movement of the platform 12a is converted into a translational movement of the central connecting element 22a, whereas a rotational component of the movement is converted into a rotation of a part region of the central connecting element 22a between the bore 26a and the platform 12a about the bore 26a of the movement conversion unit 24a and, during multiple rotation, about the bore 26a into a rotation of the central connecting element 22a about the axis of its own. The rotational component of the movement of the platform 12a is therefore filtered out and only an amount of the deflection from the rest position remains which is opposed by a resistance by way of the counterforce unit 20a. The second connecting element 23a is guided through a bore 27a of analogous configuration with a rounded opening in the body. In principle, it is conceivable to provide different resistance strengths for in each case one of the two movement directions 48a, 50a of the platform 12a and, instead of the central connecting element 22a, to provide different elements for the connection to separate counterforce elements. The rotational component of the movement of the platform 12a is transmitted to the counterforce unit 20a via the different spacings of the first connecting element 22a and the second connecting element 23a from the center of the platform 12a, since a rotation of the platform 12a is converted into pulling paths of different lengths of the first connecting element 22a and the second connecting element 23a on account of a different path circumference during rotation as a result of the different spacings from the center of the platform 12a. Accordingly, the first connecting element 22a and the second connecting element 23a which are configured partially in one piece with one another are deflected translationally as an entirety by a difference of the pulling paths. A translational movement of the first connecting element 22a and the second connecting element 23a is brought about by way of a difference between the pulling path of the first connecting element 22a and the pulling path of the second connecting element 23a, as a result of the rotational component of the movement of the platform 12a, independently of and in addition to a translational movement of the platform 12a, which translational movement is transmitted to the counterforce unit 20a and is opposed by the counterforce unit 20a by way of a resistance.

The counterforce unit 20a has a spring element 32a which is connected to the central connecting element 22a and opposes a translational movement of the central connecting element 22a by way of a resistance on account of a restoring force, with the result that a deflection and a rotation of the platform 12a are opposed by a resistance via the central connecting element 22a. An additional damping element 58a of the counterforce unit 20a is arranged in series with the spring element 32a. The counterforce unit 20a has an element with a non-linear force characteristic, which element is formed by the additional damping element 58a. The additional damping element 58a is configured as a braided rubber cable with a non-linear force characteristic. In alternative refinements of the counterforce unit 20a, the additional damping element 58a of the counterforce unit 20a can be arranged parallel to the spring element 32a. Furthermore, the central connecting element 22a is provided for damping of the movement of the platform 12a by means of external friction, since the central connecting element 22a comes into frictional contact during a translational movement with the surface of the bore 26a in accordance with the Euler-Eytelwein formula and, during said external friction, kinetic energy of the central connecting element 22a and therefore of the platform 12a is dissipated, as a result of which the movement of the platform 12a is damped. In particular, the external friction of the central connecting element 22a with the surface of the bore 26a is provided for damping a reverberation of the platform 12a during deflection and for damping movements as a result of a person climbing on. In the exemplary embodiment which is shown, both the central connecting element 22a and the surface of the rounded opening of the bore 26a are manufactured from steel, but in principle both the central connecting element 22a and the surface of the rounded opening of the bore 26a can be manufactured from other materials. On a path between the bore 26a and the spring element 32a, the central connecting element 22a is deflected by means of a deflection roller 54a. The apparatus 10a has an untwisting unit 56a which is formed by a turbulence bearing for a connection of the central connecting element 22a and the spring element 32a, which turbulence bearing makes a rotation of the central connecting element 22a about the axis of its own possible, with the result that an action of force on the spring element 32a as a result of the rotation of the connecting element 22a about the axis of its own is avoided and the spring element 32a is loaded merely with an action of force as a result of the amount of the deflection of the platform 12a from the rest position. The untwisting unit 56a which is formed by the turbulence bearing is connected via a sleeve element 28a to the spring element 32a. It is conceivable in alternative refinements that, in addition to or instead of the spring element 32a, the counterforce unit 20a has, for example, an eddy current brake or a friction brake for damping.

A setting unit 34a is provided for setting a counterforce strength of the counterforce unit 20a. The setting unit 34a has an electric actuator 36a which sets a prestressing force on the spring element 32a. The counterforce strength of the counterforce unit 20a is set via a setting of the prestressing force of the spring element 32a by way of the actuator 36a, since firstly a deflection of the central connecting element 22a by the platform 12a is opposed by a higher counterforce by way of an increased prestressing force and secondly a change in a frictional force with the surface of the bore 26a in accordance with the Euler-Eytelwein formula is achieved on account of a changed force on the central connecting element 22a. The setting unit 34a has a control unit 40a which is integrated into the setting unit 34a and which comprises a computing unit and a memory unit with programs which are stored therein. The control unit 40a is provided for actuating the actuator 36a for adapting the damping. In particular, different counterforce strengths can be set for adapting the apparatus 10a to different requirements of users of the apparatus 10a, for example to different degrees of balance impairment of different persons who carry out balance training during therapy. A setting of the counterforce strength can take place in an infinitely variable manner on account of the electric actuator 36a. In its memory unit, the control unit 40a has, in particular, various training programs stored with different degrees of difficulty which are realized via different counterforce strengths, the degree of difficulty changing during the course of the training program being carried out in some training programs. In particular, a setting and adaptation of the counterforce strengths can be carried out during use of the apparatus 10a by means of the setting unit 34a via the control unit 40a and the electric actuator 36a, as a result of which it is made possible to realize training programs with different counterforce strengths and therefore degrees of difficulty without an interruption of the training program for adapting the counterforce strength. The control unit 40a is provided for carrying out a training program, in which a slow reduction in the counterforce strength of the counterforce unit 20a as a result of an increase in a deflection amplitude of the platform 12a is superimposed with a rapid increase in the counterforce strength. The rapid increase in the counterforce strengths serves to avoid an excessively large increase in the deflection amplitude of the platform 12a, whereas, as a result of the slow reduction in the counterforce strength during the course of the training program as a result of a gradual increase in a deflection amplitude during an identical movement of a person on the platform 12a, the person is challenged again and again in the course of the training program and a high training effect is therefore achieved. In particular, the training program comprises an initial phase with a high counterforce strength, in which initial phase movements of the person on the platform 12a lead only to a small deflection of the platform 12a. After the initial phase, a transition into an actual training phase takes place by way of the slow reduction in the counterforce strength of the counterforce unit 20a, in which actual training phase on account of the reduction of the counterforce strength of the counterforce unit 20a, a resulting increase in the deflection amplitude of the platform 12a is actuated by way of the control unit 40a to produce a rapid increase in the counterforce strength and is superimposed on the slow reduction in the counterforce strength, which results in rapidly changing training conditions, by way of which a high training effect is achieved.

Furthermore, in cooperation with the games console 44a, it is possible by means of the control unit 40a to simulate different situations for training games on the games console 44a by way of different counterforce strengths, for example in order to train astronauts. In alternative refinements, the control unit 40a can be integrated into the games console 44a, with the result that an actuation of the setting unit 34a can take place by way of the games console 44a. Furthermore, alternative refinements are conceivable, in which an adaptation of the counterforce strength is performed by hand on the spring element 32a.

The control unit 40a is provided to set the counterforce strength depending on measured values of at least one sensor 42a for measuring deflection of the platform 12a. The sensor 42a is formed by a camera, via which the control unit 40a achieves the movement of the platform 12a using a detection of markings on an underside of a platform 12a. In alternative refinements, the sensor 42a can be formed for positional measurements of the platform 12a by other sensors 42a which appear to be suitable to a person skilled in the art.

FIG. 3 shows a diagrammatic illustration of an arrangement of the first connecting element 22a and the second connecting element 23a and a connection of the platform 12a to the counterforce unit 20a via the first connecting element 22a and the second connecting element 23a. The platform 12a is shown in the rest position. The further connecting element 38a can be configured as an element of a force interruption unit, by said further connecting element 38a first of all, in a released state, being tautened by way of a translation of the connecting elements 22a, 23a, the spring element 32a being largely free of force loadings during tautening of the further connecting element 38a and therefore not generating a counterforce, with the result that the connecting elements 22a, 23a can translate as far as complete tautening in a manner which is free from counterforce. An operating mode can therefore be provided, in which the deflection or rotation takes place partially free from a counterforce or a countermoment in a part range of a translational deflection or a rotation. The further connecting element 38a can be tautened or relieved by means of the actuator 36a for a presetting, a change or adaptation during operation of a part range of the translational deflection or the rotation, by said operation taking place in a manner which is free from the counterforce or the countermoment.

FIG. 4 shows a further exemplary embodiment of the invention. The following descriptions and the drawing are restricted substantially to the differences between the exemplary embodiments, it being possible in principle for reference also to be made to the drawings and/or the description of the other exemplary embodiments, in particular of FIGS. 1 to 3, with regard to components with identical designations, in particular in relation to components with identical reference numerals. In order to distinguish the exemplary embodiments, the letter a is placed behind the reference numerals of the exemplary embodiment in FIGS. 1 to 3. The letter a is replaced by the letter b in the exemplary embodiments of FIG. 4.

In FIG. 4, in a diagrammatic illustration, analogously to FIG. 3, an apparatus 10b for balance training and/or fine motor skills training is with a movable platform 12b which can be moved rotationally and translationally in two dimensions, and with a counterforce unit 20b which opposes a force provided for a rotation of the at least one platform 12b by means of a resistance, and with a first connecting element 22b and to a second connecting element 23b which connect the counterforce unit 20b to the platform 12b, the first connecting element 22b and the second connecting element 23b being arranged on the platform 12b at a respectively different spacing from a center of said platform 12b and transmitting a counterforce which is generated by the counterforce unit 20b for generating a countermoment which counteracts a rotation of the at least one platform 12b to the at least one platform 12b. The first connecting element 22b is configured as a central connecting element 22b which runs at least partially along a zero axis 30b of a rest position of the platform 12b. The platform 12b is shown in the rest position. In this exemplary embodiment, the first connecting element 22b and the second connecting element 23b are connected to the counterforce unit 20b separately from one another. The first connecting element 22a is connected to a spring element 33a after passing through a bore 26a and is connected via a further connecting element 38b to an electric actuator 36b of a setting unit 34b of the counterforce unit 20b. The second connecting element 23a is connected to a spring element 33a after passing through a bore 27a and is connected via a further connecting element 39b to an electric actuator 37a of the setting unit 34b of the counterforce unit 20b. The electric actuators 36b, 37b additionally set a prestress of the spring elements 32b, 33b and/or load and/or relieve the spring elements 32b, 33b during operation of the apparatus 10b. During a rotation of the platform 12b about a center axis, the connecting elements 32b, 33b are moved along circumferential paths of different lengths on account of the respectively different spacing from the center of the platform 12b and are therefore deflected by different distances from a previous position. The further connecting elements 38b, 39b can be configured as a force interruption unit, by said connecting elements 38b, 39b first of all being tautened, in a released state, by way of a translation of the connecting elements 22b, 23b, the spring elements 32b, 33b being largely free from loading during tautening of the further connecting elements 38b, 39b and therefore not generating a counterforce, with the result that the connecting elements 22b, 23b can translate as far as complete tautening in a manner which is free from counterforce. An operating mode can therefore be provided, in which the deflection or rotation takes place partially free from a counterforce or a countermoment in a part range of a translational deflection or a rotation. The further connecting elements 38b, 39b can be tautened or relieved by means of the actuators 36b, 37b for a presetting, a change or adaptation during operation of a part range or the translational deflection or the rotation, by said operation taking place in a manner which is free from the counterforce or the countermoment.

LIST OF REFERENCE NUMERALS

10 Apparatus
12 Platform
14 Suspension unit
16 Suspension element
18 Suspension element
20 Counterforce unit
22 Connecting element
23 Connecting element
24 Movement conversion unit
26 Bore
27 Bore
28 Sleeve element
30 Zero axis
32 Spring element
33 Spring element
34 Setting unit
36 Actuator
37 Actuator
38 Connecting element
39 Connecting element
40 Control unit
42 Sensor
44 Games console
46 Handle
48 Movement direction 50 Movement direction
52 Frame
54 Deflection roller
56 Untwisting unit
58 Additional damping element

The invention claimed is:

1. An apparatus for balance training and/or fine motor skills training, comprising:
    at least one movable platform which is adapted to be moved at least rotationally, the movable platform having a standing surface configured for a person to stand and to deflect the at least one platform on account of his/her own movements;
    at least one counterforce unit which is provided to oppose a torque with a counterforce, said torque leading to a rotation of the at least one platform; and
    at least one first connecting element and at least one second connecting element which connect the counterforce unit to the at least one platform,
    wherein the at least one first connecting element and the at least one second connecting element are arranged at the at least one platform at a respectively different spacing from a center of the at least one platform;
    wherein the apparatus for balance training and/or fine motor skills further comprises at least one setting unit which is provided for setting a counterforce strength, the at least one setting unit having at least one actuator, the at least one actuator being an electric actuator which sets a prestressing force on a spring element of the at least one counterforce unit; and
    wherein the counterforce strength of the at least one counterforce unit is set via a setting of the prestressing force of the spring element by way of the actuator, since
        firstly a deflection of a central connecting element by the at least one platform is opposed by a higher counterforce by way of an increased prestressing force, and
        secondly a change in a frictional force with the surface of a bore in accordance with the Euler-Eytelwein formula is achieved on account of a changed force on the central connecting element.

2. The apparatus according to claim 1, wherein the at least one first connecting element is configured as the central connecting element which, in one rest position, runs along a zero axis of a rest position of the at least one platform.

3. The apparatus according to claim 2, wherein the at least one counterforce unit has at least one movement conversion unit which converts a rotational component of the at least two-dimensional movement of the at least one platform into a rotational movement of the central connecting element about an axis of said at least one movement conversion unit.

4. The apparatus according to claim 3, wherein the movement conversion unit has at least one sleeve with a rounded opening, or the bore has a rounded opening.

5. The apparatus according to claim 1, wherein the at least one first connecting element and the at least one second connecting element are connected to the counterforce unit separately from one another.

6. The apparatus according to claim 5, wherein the at least one first connecting element and the at least one second connecting element are configured at least partially in one piece with one another.

7. The apparatus according to claim 1, wherein the at least one counterforce unit has an additional damping element, which is arranged in series with the spring element.

8. The apparatus according to claim 7, wherein the additional damping element is configured as a braided rubber cable with a non-linear force characteristic.

9. The apparatus according to claim 1, wherein the at least one counterforce unit has the spring element.

10. The apparatus according to claim 1, wherein the at least one setting unit has a control unit.

11. The apparatus according to claim 1, wherein the at least one first connecting element and the at least one second connecting element are provided for damping the movement of the at least one platform by external friction using a further component of the apparatus, the further component being different than the central connecting element.

12. The apparatus according to claim 1, wherein the at least one counterforce unit has at least one element with a non-linear force characteristic.

13. The apparatus according to claim 2, wherein the at least one first connecting element and the at least one second connecting element are connected to the counterforce unit separately from one another.

14. The apparatus according to claim 1, wherein the spring element is connected to the central connecting element and opposes a translational movement of the central connecting element by way of a resistance on account of a restoring force, with the result that a deflection and a rotation of the platform are opposed by a resistance via the central connecting element.

15. The apparatus according to claim 1, wherein an operating mode is provided in which the deflection or rotation takes place partially free from a counterforce or a countermoment in a part range of a translational deflection or a rotation.

16. The apparatus according to claim 1, further comprising
    a further connecting element, which is configured as an element of a force interruption unit, wherein the further connecting element is first of all, in a released state, configured to be tautened by way of a translation of the at least one first connecting element and the at least one second connecting element,
    wherein the spring element is largely free of force loadings during tautening of the further connecting element and therefore does not generate a counterforce, with the result that the at least one first connecting element and the at least one second connecting element are adapated to translate as far as complete tautening in a manner which is free from counterforce.

17. A method of using an apparatus for balance training and/or fine motor skills training, the method comprising:
    standing by a person on a standing surface of at least one movable platform of the apparatus, which is adapted to be moved at least rotationally, the person deflecting the platform on account of his/her own movements;
    opposing a torque with a counterforce by at least one counterforce unit, said torque leading to a rotation of the at least one platform; and
    setting a counterforce strength by at least one setting unit, the at least one setting unit having at least one actuator, the at least one actuator being an electric actuator setting a prestressing force on a spring element of the at least one counterforce unit, wherein the counterforce strength of the at least one counterforce unit is set via a setting of the prestressing force of the spring element by way of the actuator, since firstly a deflection of a central connecting element by the platform is opposed by a higher counterforce by way of an increased prestressing force, and secondly a change in a frictional force with the surface of a bore in accordance with the Euler-Eytelwein formula is achieved on account of a changed force on the central connecting element.

18. The method according to claim 17, wherein
the standing and the opposing the torque are performed under conditions of reduced gravity.

19. The method according to claim 17, wherein
the at least one setting unit has a control unit.

20. The method according to claim 17, wherein
the method is performed in cooperation with a games console.

\* \* \* \* \*